United States Patent
Cormier et al.

(10) Patent No.: US 7,628,444 B2
(45) Date of Patent: Dec. 8, 2009

(54) ANISOTROPIC MULTI-SECTIONAL MODULAR ENERGY ABSORBER AND METHOD FOR CONFIGURING SAME

(75) Inventors: Joel Matthew Cormier, Ferndale, MI (US); Ryan Johnson Brooks, Allen Park, MI (US); Richard Francois Audi, Dearborn, MI (US)

(73) Assignee: Oakwood Energy Management, Inc., Dearborn, MI (US)

( * ) Notice: Subject to any disclaimer, the term of this patent is extended or adjusted under 35 U.S.C. 154(b) by 239 days.

(21) Appl. No.: 11/559,504

(22) Filed: Nov. 14, 2006

(65) Prior Publication Data

US 2007/0228746 A1    Oct. 4, 2007

Related U.S. Application Data

(63) Continuation-in-part of application No. 11/278,628, filed on Apr. 4, 2006.

(51) Int. Cl.
*B60R 21/04* (2006.01)

(52) U.S. Cl. .................... 296/187.03; 296/187.09; 293/102; 293/120

(58) Field of Classification Search ............ 296/187.03, 296/39.1, 187.05, 187.04, 187.09, 187.11, 296/187.12; 293/120, 102, 133; 280/751; 188/371

See application file for complete search history.

(56) References Cited

U.S. PATENT DOCUMENTS

| | | | |
|---|---|---|---|
| 4,072,334 A | 2/1978 | Seegmiller et al. | |
| 4,597,601 A | 7/1986 | Manning | |
| 5,150,935 A | 9/1992 | Glance et al. | |

(Continued)

FOREIGN PATENT DOCUMENTS

DE    19947245 A1    4/2000

(Continued)

OTHER PUBLICATIONS

European Search Report and Written Opinion for Application No. 06112732.0-2421 dated Aug. 16, 2006, Applicant: Oakwood Energy Management, Inc., 9 pages.

(Continued)

*Primary Examiner*—Joseph D Pape
(74) *Attorney, Agent, or Firm*—Brooks Kushman P.C.

(57) ABSTRACT

A multi-sectional, modular energy absorber 10 comprising one or more modules, which have one or more energy absorbing units 12. Some have a first section 14 and a second section 16 in some embodiments that are united like a clamshell to form the energy absorbing unit 12. There is a means for locating the sections 18 in relation to each other. First and second flange sections 20,22 extend from at least some of the first and second sections. There are means for coordinating energy absorbing units 24 in one of the one or more modules, the means for coordinating 24 having a topography including a number (n) of apertures 26 defined therein, where n is an integer$\geq 0$. At least some of the sections include an upper perimeter 28, a lower perimeter 30 and an intermediate wall 32 extending therebetween with a number (m) of breaches defined in the intermediate wall before impact, where m is an integer$\geq 0$. When positioned over an underlying elongate support member, the energy absorption characteristics at the distal ends of the absorber differ from those at its central region.

27 Claims, 17 Drawing Sheets

U.S. PATENT DOCUMENTS

| | | |
|---|---|---|
| 5,549,327 A | 8/1996 | Rusche et al. |
| 6,199,937 B1 | 3/2001 | Zetouna et al. |
| 6,247,745 B1 | 6/2001 | Carroll, III et al. |
| 6,406,081 B1 | 6/2002 | Mahfet et al. |
| 6,443,513 B1 | 9/2002 | Glance |
| 6,550,850 B2 | 4/2003 | Laborie et al. |
| 6,669,251 B2 | 12/2003 | Trappe |
| 6,726,262 B2 | 4/2004 | Marijnissen et al. |
| 6,746,061 B1 | 6/2004 | Evans |
| 6,749,784 B2 | 6/2004 | Blanchon |
| 6,848,730 B2 | 2/2005 | Evans |
| 6,863,322 B2 | 3/2005 | Hunter et al. |
| 6,923,494 B2 | 8/2005 | Shuler et al. |
| 6,926,321 B2 | 8/2005 | Zipfel |
| 6,938,936 B2 | 9/2005 | Mooijman et al. |
| 7,073,831 B2 | 7/2006 | Evans |
| 2002/0113459 A1 | 8/2002 | Laborie et al. |
| 2003/0080573 A1 | 5/2003 | Marijnissen et al. |
| 2004/0036302 A1 | 2/2004 | Shuler et al. |
| 2004/0094977 A1 | 5/2004 | Shuler et al. |
| 2004/0174025 A1 | 9/2004 | Converse et al. |
| 2005/0057053 A1 | 3/2005 | Evans et al. |
| 2005/0161982 A1 | 7/2005 | Cormier et al. |
| 2005/0230204 A1 | 10/2005 | Tamada et al. |
| 2005/0230205 A1 | 10/2005 | Springler et al. |
| 2005/0269824 A1 | 12/2005 | Steeg et al. |
| 2006/0028038 A1 | 2/2006 | Glasgow et al. |
| 2006/0131901 A1 * | 6/2006 | Nguyen et al. .............. 293/120 |

FOREIGN PATENT DOCUMENTS

| | | |
|---|---|---|
| EP | 0863056 A1 | 9/1998 |
| FR | 2870802 A | 12/2005 |

OTHER PUBLICATIONS

International Search Report and Written Opinion, International Application No. PCT/US06/13656; Applicant: Oakwood Energy Management, Inc.

* cited by examiner

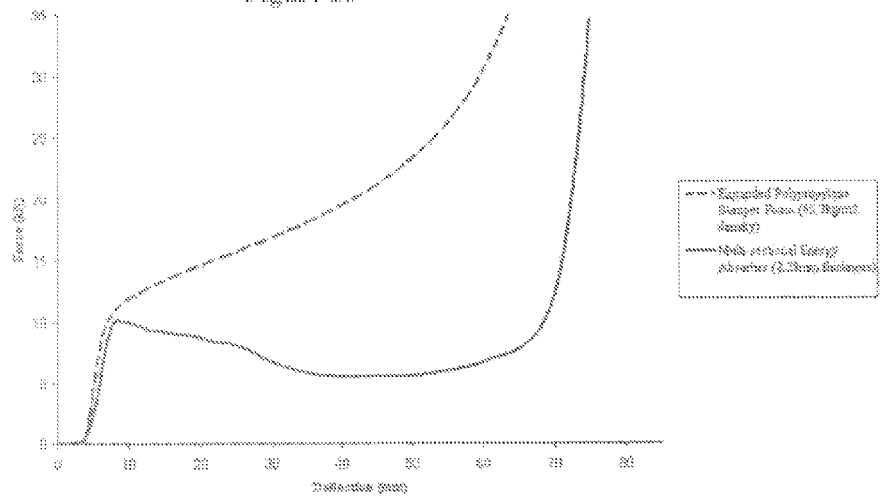
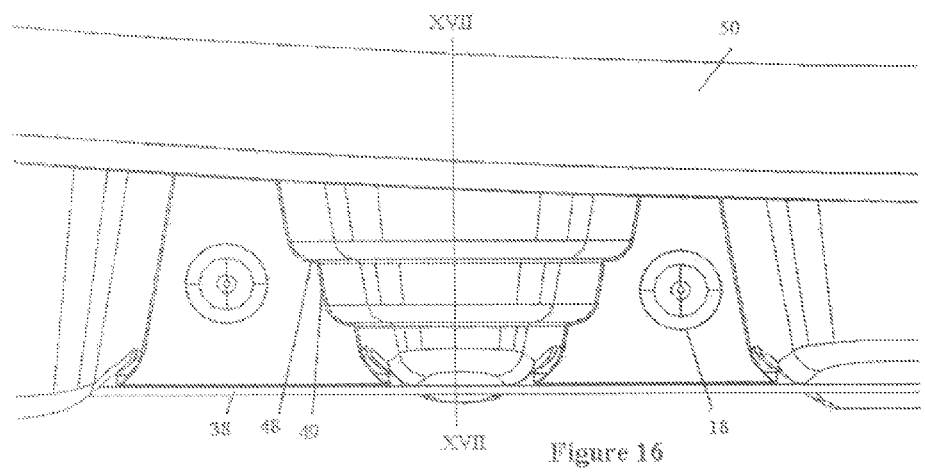

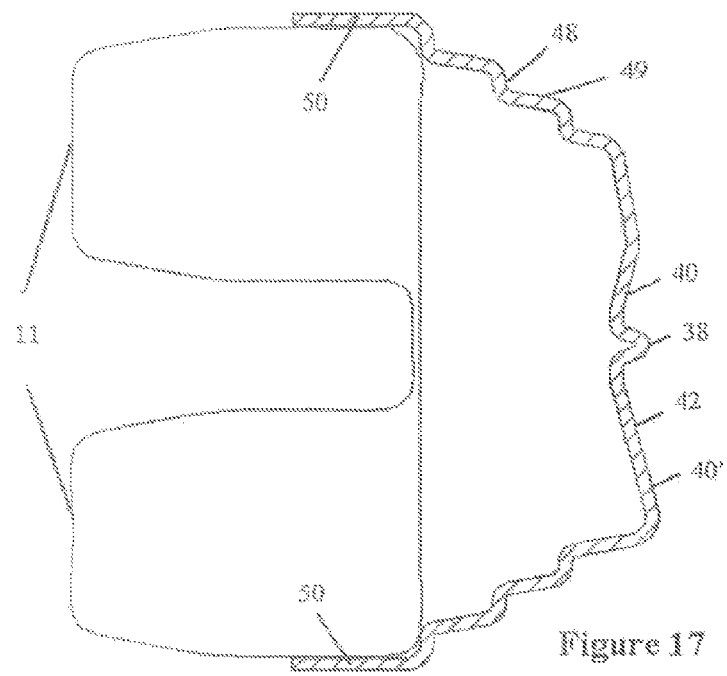
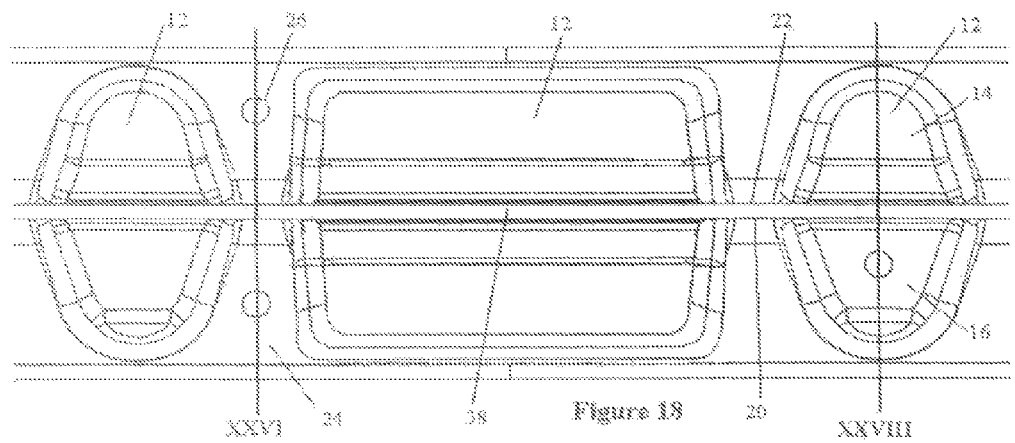

ANISOTROPIC MULTI-SECTIONAL MODULAR ENERGY ABSORBER AND METHOD FOR CONFIGURING SAME

CROSS-REFERENCE TO RELATED APPLICATION

This application is a continuation-in-part of U.S. application Ser. No. 11/278,628, filed Apr. 4, 2006. The present application claims the benefit under 35 U.S.C. § 120 of the parent application, which is hereby incorporated herein by reference.

BACKGROUND OF THE INVENTION

1. Field of the Invention

This invention relates to vehicle occupant safety during a collision, and more specifically to an anisotropic multi-sectional "customized" or "tunable" multi-sectional energy absorber that absorbs energy imparted by an incident object that impacts the absorber, and a method for configuring the absorber.

2. Background Art

Bumpers provide protection to pedestrians as well as occupants during collisions. Designed to absorb and deliver momentum when a vehicle is in an accident, bumpers are provided with designed components. When assembled, the components form a bumper system that is usually mounted on the front and rear of the vehicle. Often built with "crumple zones", bumpers traditionally include designs that enable a specific bumper part to flex during collisions.

It is desirable for the bumper system to absorb as much impact energy in as little crush distance as possible, with as little weight as possible, yet be capable of being designed and manufactured under favorable economic conditions.

Generally, one or more energy absorbers are positioned between a vehicle occupant and an incident force. In low speed impacts, the absorber serves to minimize damage to the fascia, lamps, and other components. In high speed impacts, the absorber serves to protect occupants and pedestrians from injury.

Conventionally, an energy absorber can be manufactured at relatively low cost by thermoforming and impact performance can be optimized without expensive tooling modification at heights below about 50 millimeters. However, above this height, the base material thickness required to produce an energy absorber for the appropriate crush resistance is such that it cannot easily and inexpensively be produced using in-line thermoforming equipment. In such circumstances, injection molded absorbers can be produced, perhaps at a lower cost.

A search that preceded the filing of this application revealed the following U.S. references Pat. Nos. 7,073,831; 6,938,936; 6,926,321; 6,923,495; 6,863,322; 6,848,730; 6,749,784; 6,746,061; 6,726,262; 6,669,251; 6,550,850; 6,443,513; 6,406,081; 6,247,745; 6,199,937; 5,150,935; 4,597,601; 4,072,334; US2003/0080573; US2004/0036302; US2004/0094977; US2004/0174025; US2005/0057053; US2005/0230204; US2005/0230205; US2005/0269824; and US2006/0028038.

SUMMARY OF THE INVENTION

One object of the present invention is to provide a more cost effective, efficient anisotropic multi-sectional energy absorber that can be "customized" or "tuned" to produce predefined energy absorption characteristics within spatial constraints that may be imposed by a particular application. For example, it would be desired to provide an energy absorber that is designed for maximum stiffness and coverage at its ends while being more compliant or softer in a central region.

The invention includes a multi-sectional modular energy absorber with one or more energy absorbing modules that are provided with one or more energy absorbing units therewithin. As used herein the term "energy absorbing module" means an assembly of "crush boxes" or energy absorbing units that are united by a common means for coordinating the units. At least some of the modules have one or more multi-sectional energy absorbing units. In one embodiment, a first section and a second section unite to form a given energy absorbing unit. Preferably, these sections are located in relation to each other by means for locating the sections, such as a hinge, clips, glue, inter-engaging male-female members, dovetails, welding, pins, and combinations thereof, and the like.

One preferred (but not exclusive) method of manufacturing is thermoforming. It is known that thermoforming involves stretching a heated plastic sheet of constant thickness over a tool in the shape of the desired part. The stretching step results in a thinning of the sheet and ultimately in a non-uniform thickness distribution within the part may result. Such problems are addressed by the invention. In one embodiment, the first and second sections extend from the leaves of a living hinge region that is positioned therebetween. In that embodiment, the sections and hinge cooperate like a clamshell. They emerge from a thermoforming tool, for example, in an open position. (See, FIG. 9). In use, the two sections can be united about the hinge region to form the energy absorbing unit.

The means for coordinating is terminated by a continuous periphery so that within the periphery, the means for coordinating may be planar, curved, or curvilinear. The coordinating means has a topography with a variable number (n) of apertures, where n is an integer $\geq 0$. The means for coordinating alternatively includes a web, a tether, a hinge, a planar or curved surface, and wings or combinations thereof that serve to position and support the energy absorbing units in relation to each other before, during and after relative motion between an incident object and the energy absorber. Impact between the energy absorbing units and the incident object results in forces that are at least partially absorbed by the sections and common wall therebetween so that a blow imparted to a vehicle and its occupant(s) is cushioned. In the event of a vehicle impacting a pedestrian, the absorber serves to reduce the load on its lower extremities and induce rotation of the impacting object onto the hood or bonnet.

In one embodiment, the two sections of the energy absorbing units (e.g. the clamshell in a closed configuration) have an upper perimeter, a lower perimeter, and an intermediate crushable wall extending therebetween. Either the upper or lower perimeters can be presented to the impacting force.

The energy absorbing units at least partially collapse during energy absorption to a crushed configuration which in part is determined by the provision of a number (m) of breaches that are defined in the wall of a unit before impact, where m is an integer $\geq 0$. The breaches may be defined by slits (no material removed) or slots (material removed to form an opening), or both. Thus, within a given multi-sectional energy absorbing module, the means for coordinating may or may not be flat; may or may not have a number (n) of apertures; one or more of the sections in the energy absorbing units in a given module may be provided with a number (m) of breaches (e.g. slits, or slots, or slits and slots, or neither slits nor slots); and the means for coordinating may be provided with a flat or bent or undulating curvilinear topography.

To configure the bi-sectional embodiment of the multi-sectional modular energy absorber, the following steps are taken:

selecting a first section and a second section of one or more energy absorbing units according to given spatial constraints and desired energy absorbing criteria;

providing a means for coordinating energy absorbing units with a pre-defined contoured topography;

locating one or more energy absorbing units in association with the means for coordinating energy absorbing units so that the one or more energy absorbing units are positioned in relation to each other before, during and after relative motion between an incident object and the energy absorber;

providing a wall within some or all of the sections in the one or more energy absorbing units so that the wall provides an upper perimeter, a lower perimeter, and an intermediate section extending therebetween;

defining a number (m) of breaches within the wall of a section, (m) being an integer selected from the group consisting of (0, 1, 2, 3, . . . , 1000); and providing a number (n) of apertures defined within the means for coordinating energy absorbing units, (n) being an integer selected from the group consisting of (0, 1, 2, 3, . . . , 1000).

BRIEF DESCRIPTION OF THE DRAWINGS

FIG. 15 is a force versus deflection curve comparing the invention (lower line) to a foam energy absorber (upper line);

FIG. 16 is a top plan view of an alternate embodiment of the present invention;

FIG. 17 is a cross-sectional view taken along the line XVII-XVII (FIG. 16) of one energy absorbing unit of the embodiment of FIG. 16;

FIG. 18 is a front view of a central portion of an alternate embodiment of an energy absorber;

DETAILED DESCRIPTION OF THE PREFERRED EMBODIMENT(S)

1. The Energy Absorber

Figure 1:
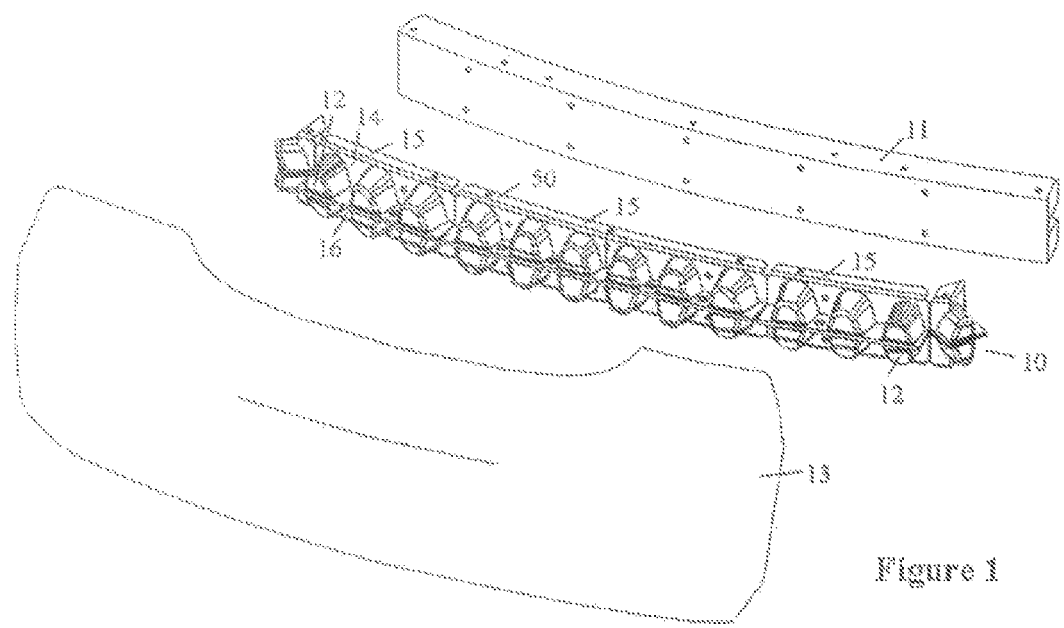
FIG. 1 is an exploded view of a bumper system including one embodiment of the anisotropic modular energy absorber of the present invention.

Turning first to FIG. 1 of the drawings, there is depicted an anisotropic multi-sectional modular energy absorber 10 that has one or more energy absorbing modules 15. As used herein, the term "anisotropic" means that the energy absorbing characteristic in some embodiments may be different in some regions of the absorber than in other regions. For example, the energy absorber may have more stiffness at its ends than at its center. The definition of the "energy absorbing module" which appears in the summary section of this application is incorporated here by reference. As depicted, the multi-sectional modular energy absorber lies between an impact beam 11 and a fascia 13, such as that which covers a vehicular bumper, a highway (crash) impact absorber and the like.

As a frame of reference, in automobile applications, the beam 11 is inboard (in relation to the vehicle center) of the multi-sectional modular energy absorber 10, while the fascia 13 lies outboard thereof. Such is the case with a vehicular front bumper system. Corresponding positions describe a rear bumper system. It will be appreciated that the term "bumper" system is used in its generic sense. Its connotation extends to virtually any situation in which there is a hit between an impacting and impacted object in such a manner that it is desirable to absorb, redirect, or redeploy at least some portion of the impacting forces generated by relative motion between the impacting and impacted objects.

The anisotropic modular energy absorber 10 is characterized by energy absorbing units 12 that in one embodiment are connected by coordinating means 24 so that each offers a "tuned" form of resistance and then buckles when impacted with sufficient force. Each module 15 includes means 24 (FIG. 2), such as a basal structure, for coordinating energy absorbing units 12 of a given energy absorbing module 15. The means for coordinating 24 has a flat or curved or undulating topography that includes a number (n) of apertures 26 defined therein, where n is an integer$\geq 0$. The apertures could be provided in the dome of an energy absorbing unit. The topography may be planar, curved, or undulating to suit the spatial constraints of the application.

Figure 9:
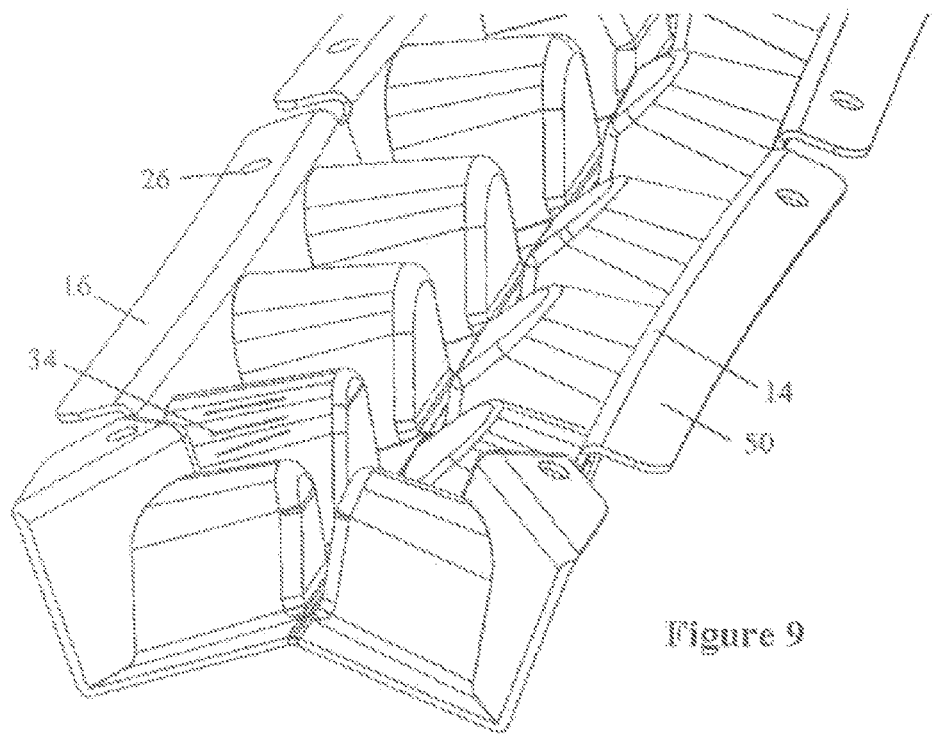
FIG. 9 is a perspective view of a bi-sectional embodiment of an energy absorbing module in which two sections of the module appear as they might emerge from a forming tool.
Figure 10:
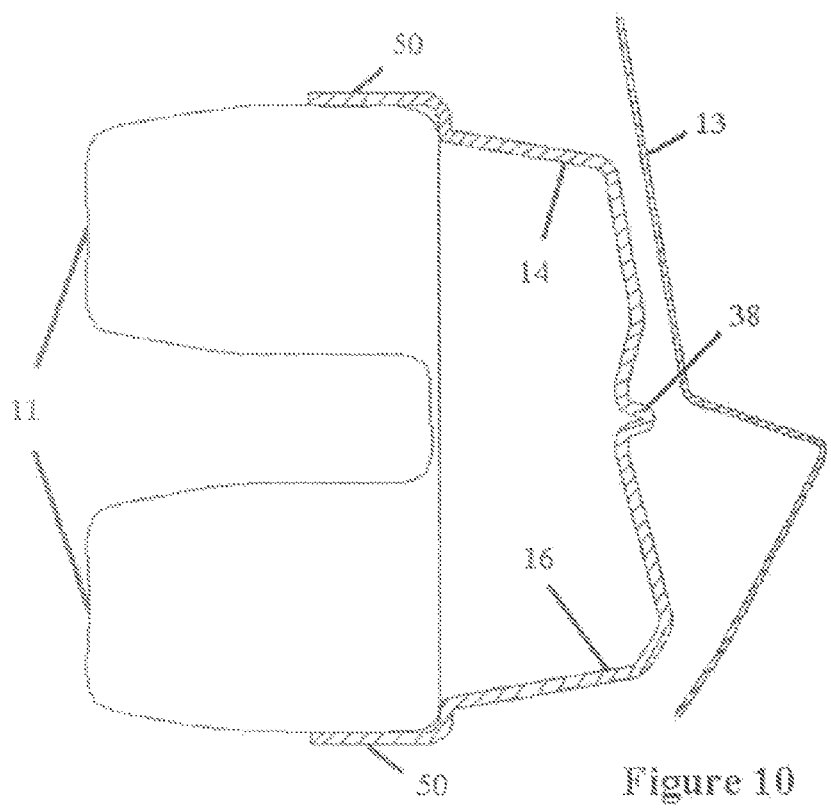
FIG. 10 depicts along the line X-X of FIG. 6 one form of a hinge region that unites two sections of a bi-sectional energy absorbing unit.
Figure 11:
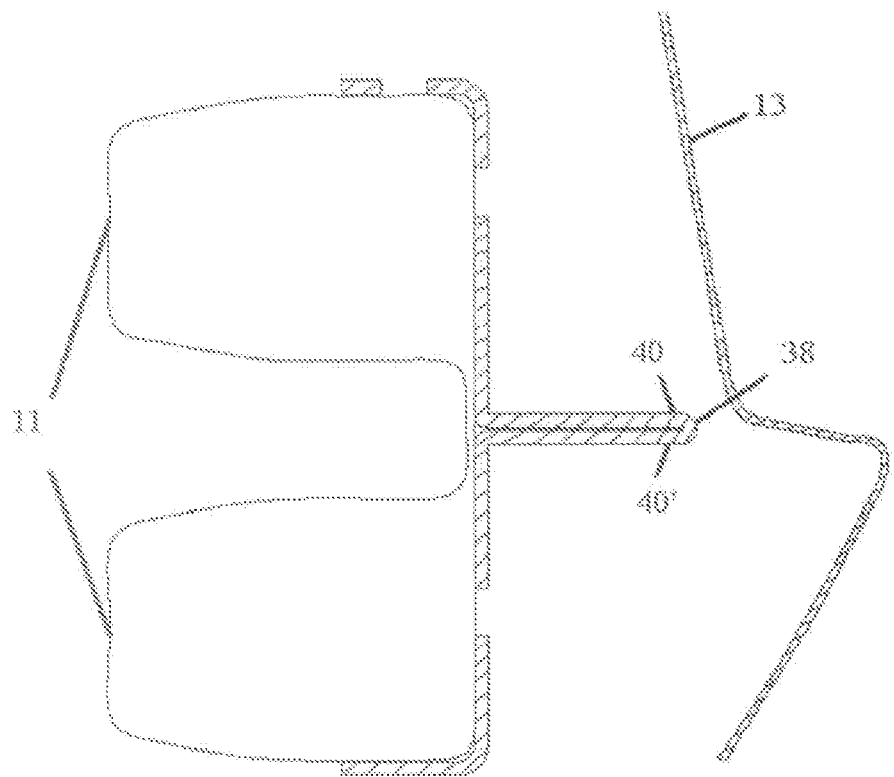
FIG. 11 depicts a sectional view along the line XI-XI of FIG. 6 of an attachment area between adjacent energy absorbing units shown in FIG. 10.

In a bi-sectional embodiment, at least some of the energy absorbing units 12 are configured like a clamshell, as depicted in FIG. 9. A given energy absorbing unit 12 has a first section 14 and a second section 16. These sections 14, 16 are united to form a given energy absorbing unit 12. It should be appreciated that the size of the first section need not be the same as the size of the second section. In some embodiments, the sections 14,16 are mirror images of each other. In other embodiments, they are not.

Figure 6:
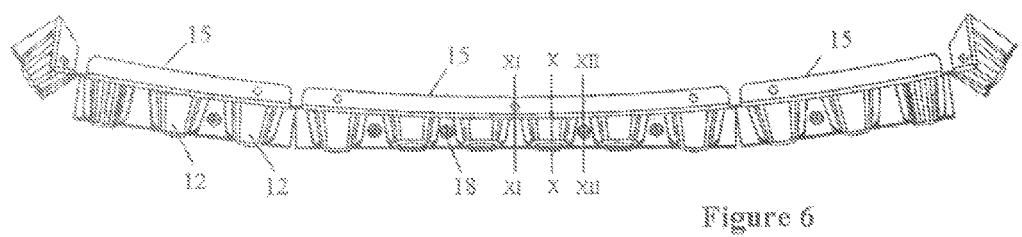
FIG. 6 is a top plan view of an energy absorber with five energy absorbing modules, similar to that depicted in FIG. 1.
Figure 12:
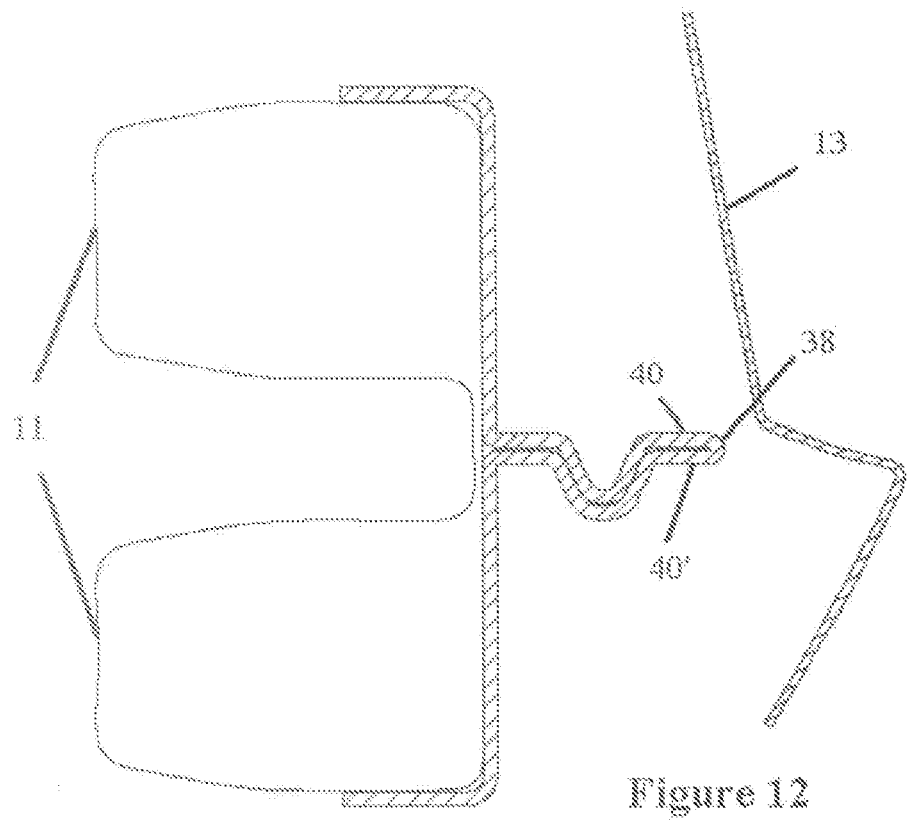
FIG. 12 depicts a sectional view along the line XII-XII of FIG. 6 illustrating a location and attachment area.
Figure 13:
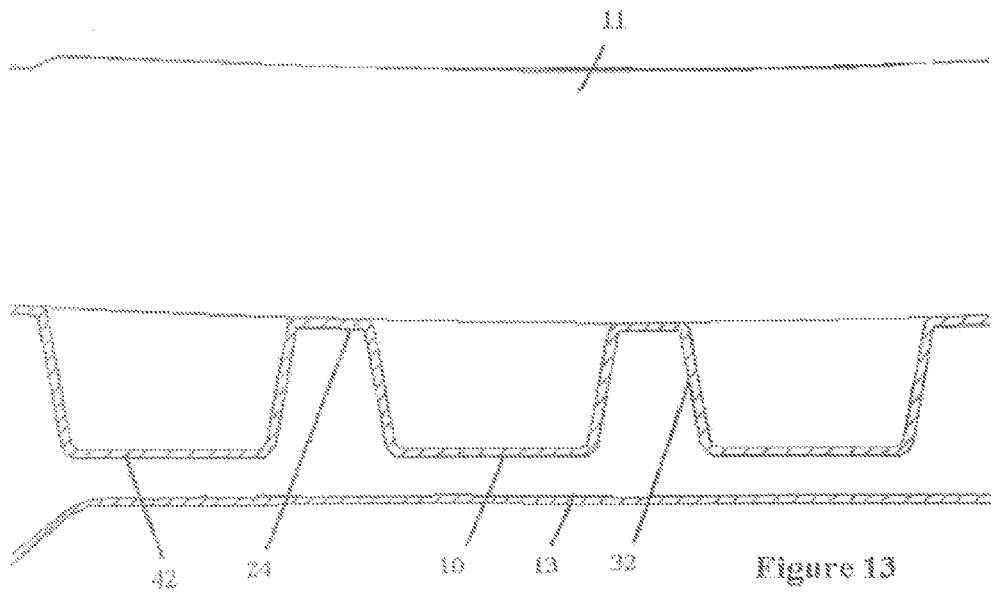
FIG. 13 is a horizontal sectional view of a multi-sectional modular energy absorber with a bumper beam that lies inboard of the multi-sectional energy absorber.

Preferably, means 18 for locating the sections 14,16 in relation to each other are provided, as depicted in FIG. 6. In one embodiment, the means for locating are represented by a female recess in one section and a male protuberance in another section. When the sections are united, the respective location means fall into registration with each other. The means for locating the sections (FIG. 12) also include the leaves 40, 40' of a living hinge 38 clips, rivets, conventional fasteners, adhesives, welding, pins, and combinations thereof.

Figure 3:
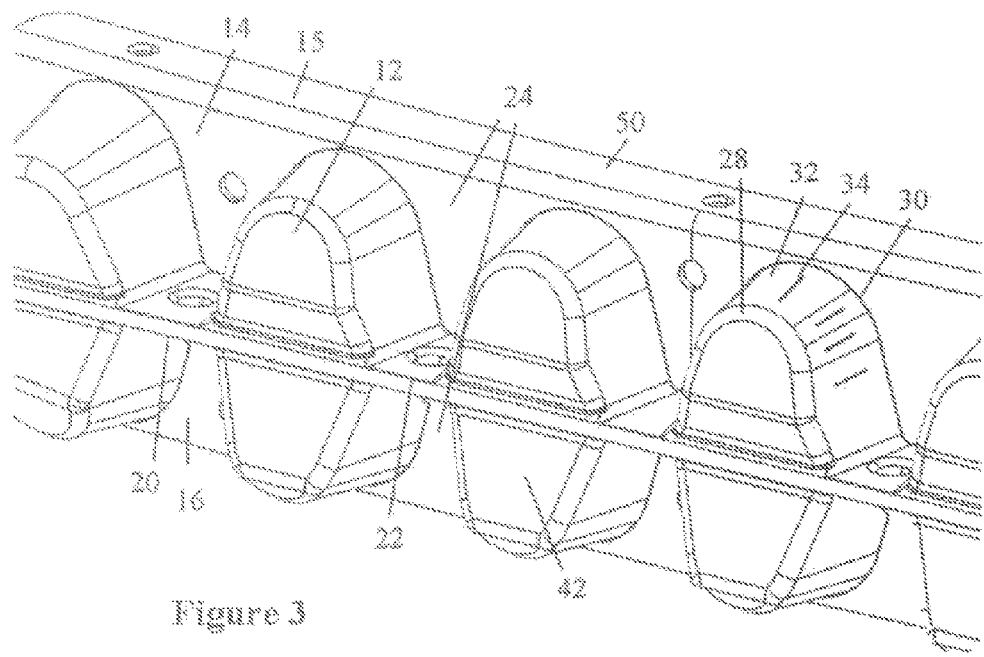
FIG. 3 is a perspective view of a bi-sectional form of energy absorbing module depicting a number of breaches within the walls of a section in some energy absorbing units.

Turning now to FIG. 3, extending from at least some of the first and second sections 14,16 are respectively pairs of first and second flange sections 20,22. When the clamshell-like bi-sectional modular energy absorber is closed, in some embodiments, the first flange 20 of a given section 14 mates with a flange 22 of the second section 16. The means 18 for locating the sections in relation to each other are provided either by a hinge alone, or within the flange sections.

In some embodiments, the energy absorbing units 12 take the form of truncated cones, parallelepipeds or crush boxes. (See, e.g., FIG. 18.) The units are further characterized by certain shapes, dimensions, wall thickness, and material type that can be "tuned" for example by using non-linear finite element analysis software to model a desired energy absorber.

It will be appreciated that in a given application, a number of energy absorbing modules 15 may be affixed to a substrate or supporting member, such as beam 11. In such cases, the beam 11 itself may serve as the means 24 for coordinating energy absorbing units and/or the means 18 for locating them. The substrate helps to position and configure energy absorbing modules to suit the needs of a particular bumper system. In a manner to be described in more detail later, it may be more desirable in some embodiments to provide energy absorbing modules of units at the distal ends of the underlying support structure that are stiffer than their counterparts in a central region.

As to be described in greater detail herein, the disclosed energy absorbers preferably are made from polymers. Polyolefins offer the best combination of cost and performance. Specifically, these may include Basell Polyolefins Pro-fax SV152 polypropylene copolymer and BP Petrochemicals 3045 polypropylene copolymer.

The energy absorbing units 12 coordinate with each other through the provision of coordinating means 24 that position and support the units in relation to each other before, during and in some cases, after relative motion between an incident object (not shown) and the multi-sectional, modular energy absorber 10. That relative motion causes impact between the energy absorbing units 12 and the incident object so that forces resulting therefrom are at least partially absorbed. In this way, the impact forces that are transmitted to an imparted object, such as a vehicle within which, for example, the multi-sectional modular energy absorber 10 is situated, are reduced. Also, the injuries sustained may be lessened.

European bumper standard (2003/102/EC) sets forth certain requirements for protecting pedestrians. To meet such standards, some aspects of the present invention include a multi-sectional energy absorber that can be tuned to the pedestrian standard by increasing the stiffness of the energy absorber on a lower portion of a bumper face (see, e.g., FIG. 20) and/or decreasing stiffness on an upper portion of the bumper face. This is designed to allow a pedestrian's leg to be pushed up and over a vehicle bonnet or hood instead of being pushed away from a vehicle. This can be accomplished by, for example, augmenting the wall volume of the energy absorber on a lower face. In an alternative embodiment, flange sections and hinge regions may be moved downwardly on the face (see, e.g., FIG. 21). When thermoformed, this design is likely to provide thinner wall profiles on the higher portion of the face and thicker wall profiles on the lower portion of the face. If desired, depending on the height of the bumper, this change in density or anisotropic properties may be made in the opposite direction, in which case stiffness is provided on the top and relative softness or compliance is provided on the bottom.

Figure 4:
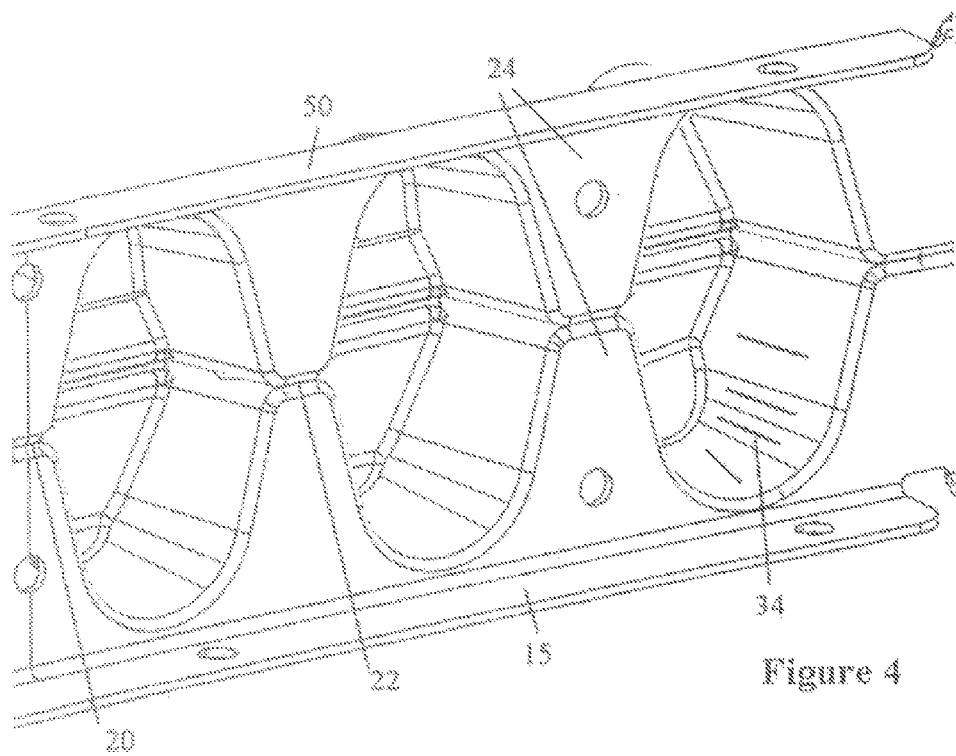
FIG. 4 is a rear perspective view of the embodiment of FIG. 3.
Figure 5:
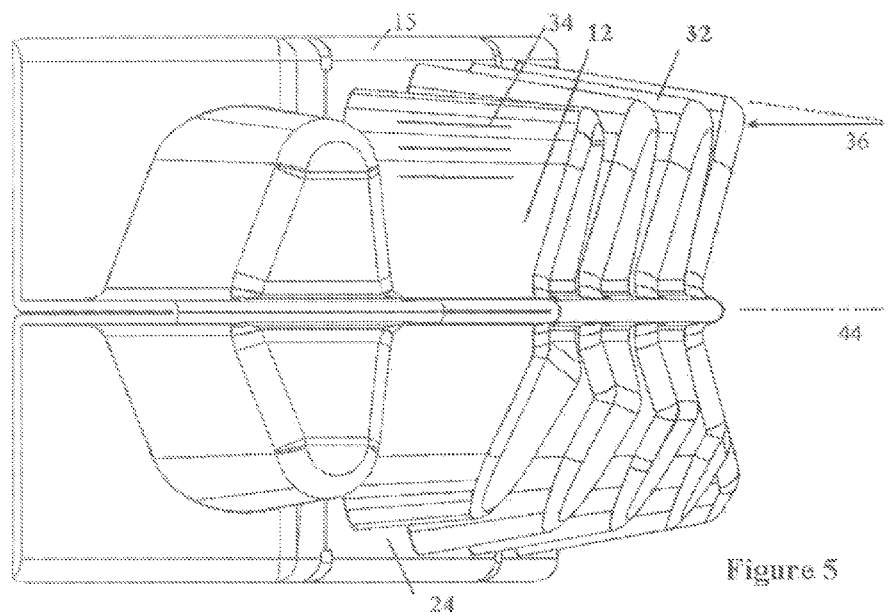
FIG. 5 is an end view thereof.

As shown in FIGS. 3-5, at least some of the sections in the energy absorbing units 12 include an upper extremity or perimeter 28, a lower extremity or perimeter 30, and an intermediate section or wall 32 extending therebetween.

Additionally, a number (m) of breaches 34 (FIG. 4) can be defined within a crushable unit 12 before impact. As used in this disclosure, the term "breaches" includes slits and slots. The term "slots" implies an aperture with facing edges which lacks material, or from which material has been removed. As used herein, the term "slits" implies a cut or gash that is formed without the removal of material. In the preferred embodiment, the slots are inclined to an axis of symmetry 44 (FIG. 5) of a given crushable unit 12 when the crushable unit 12 is presented in the form of a thermoformed cone.

Figure 2:
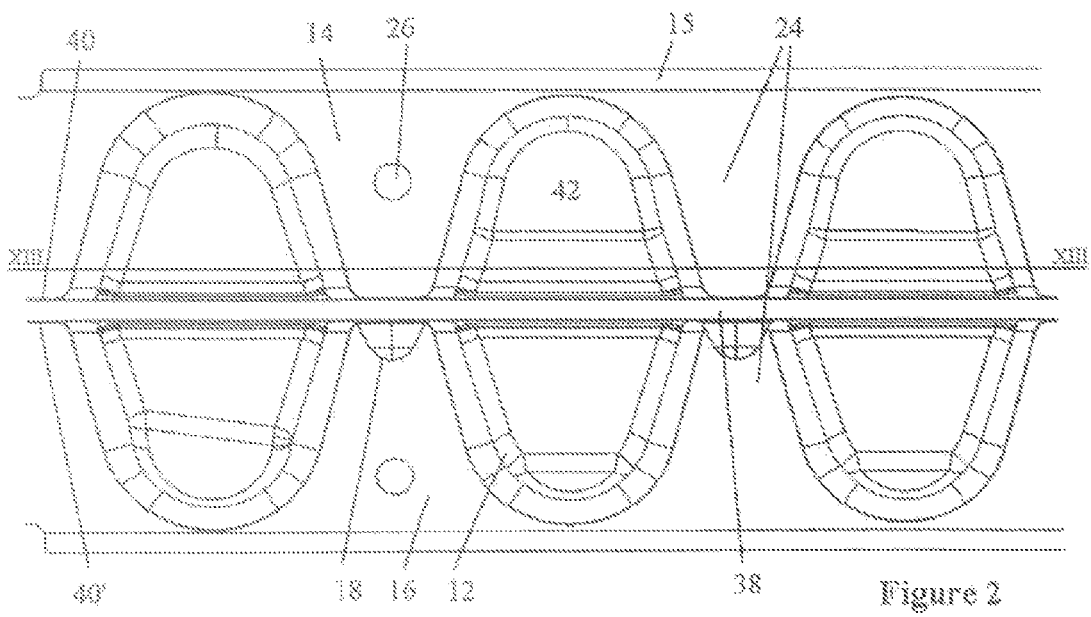
FIG. 2 is a front elevational view of one module of a bi-sectional form of energy absorber.

As depicted in FIG. 2, the multi-sectional modular energy absorber includes, in the embodiment depicted, a hinge region 38 having leaves 40, 40'. It should be appreciated that in some embodiments, the hinge region 38 may be lacking. In those embodiments, the individual sections of a given energy absorbing unit may merely interface with each other without assistance from a hinge. In those embodiments that include a hinge region 38, each leaf 40, 40' extends from one of the one or more sections 14, 16 so that the sections may be configured within the spatial constraints that are imposed by an environment within which the multi-sectional modular energy absorber 10 is positioned. The environment (not depicted) may be a highway crash barrier a headliner in a vehicle, a bumper assembly, a knee bolster, and a side impact location including a vehicle pillar, a door, an armrest, a head rest, a heel block, or seat back and other mechanical energy-absorbing applications.

In one embodiment, the means for coordinating 24 the energy absorbing units 12 takes the form of a web, a tether, a hinge, a planar surface (as depicted), rings, a supporting member, or a combination thereof. In some cases, no apertures (n=0) are provided in the energy absorbing coordinating means.

Figure 7:
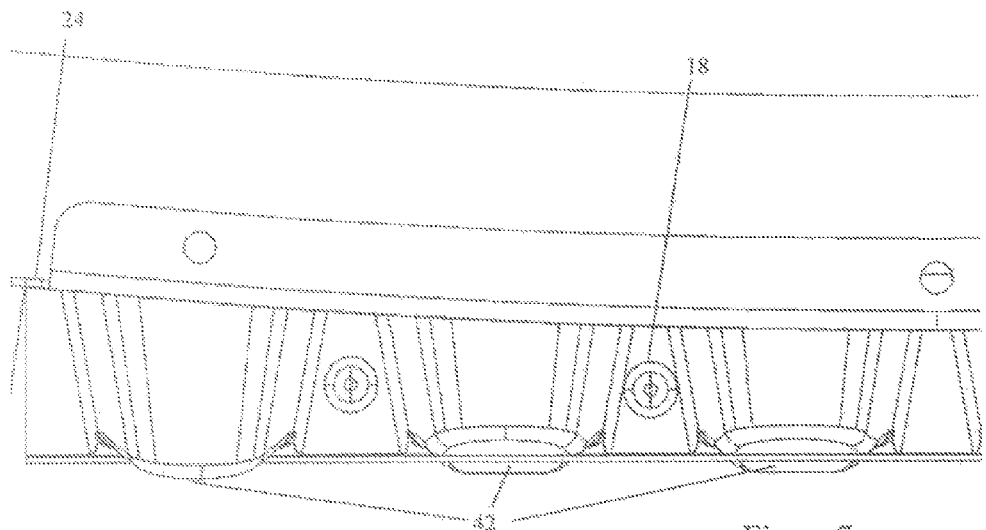
FIG. 7 illustrates one embodiment of a means for locating the sections of an energy absorbing unit in relation to each other.

In FIG. 7, locating means 18 are provided between sections 14, 16 in order to coordinate the deformation and energy absorbing characteristics of adjacent sections. It will be appreciated that such means may take the form of an adhesive, a clip, a vibration weld, an infrared weld, a thermo-weld, a sonic weld, a heat stake, a "tongue in groove," a dovetail arrangement, and the like.

Figure 8:
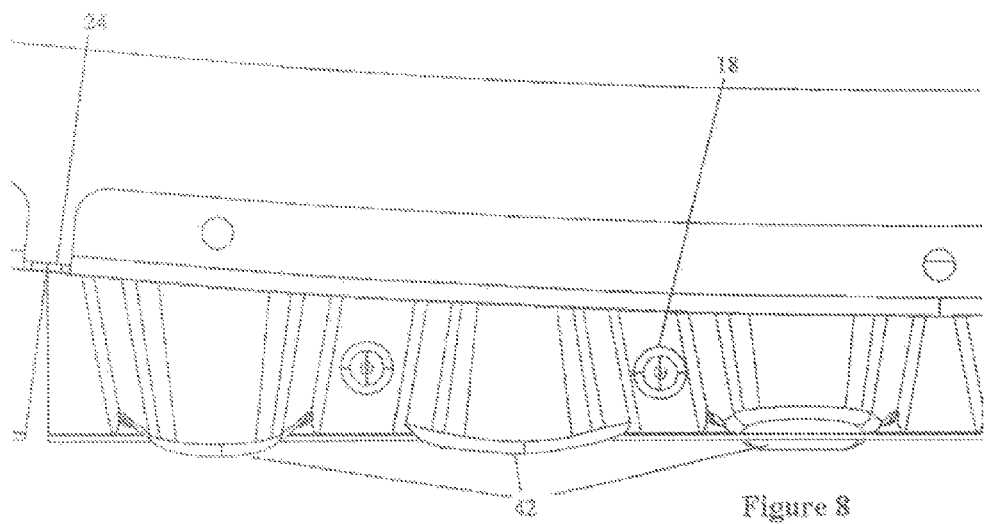
FIG. 8 depicts an embodiment of a multi-sectional energy absorber in which energy absorbing units are placed in a staggered or alternating sequence and in which various dome sizes of energy absorbers are alternately positioned forwardly and rearwardly.

It will also be appreciated (FIG. 8) that the absorbers depicted in FIGS. 2-7 may be configured such that adjacent energy absorbing units 12 may be located in such a way that the periphery of the dome 42 of a given unit 12 may be sized differently from that of the adjacent unit.

In some embodiments, the dome 42 or coordinating means 24 may have a configuration that is non-planar. For example, the dome 42 may undulate or be otherwise configured (either upwardly-convex or downwardly concave) in order to conform the multi-sectional modular energy absorber 10 to the spatial constraints imposed by the environment in which the absorber is installed.

It will be appreciated that as a result of "tuning" the energy absorber (e.g. dimensional control of wall height, provision of slits or slots or neither, wall thickness, selection of draft angle (positive or negative), and material selection), the configuration following impact may, if desired, be located in substantially the same or (usually) in a different or from the position as the pre-impact configuration.

In a given energy absorbing unit 12, where there are usually two sections. One or each of the sections 14,16 are provided with an upper perimeter 28, a lower perimeter 30, and an intermediate wall 32. In the wall 32, there may be a number (m) of breaches defined before impact, where m is an integer $\geq 0$. The intermediate wall 32 at least partially collapses during energy absorption. In general, if desired, the multi-sectional modular energy absorber 10 can be configured so that the wall 32 can substantially recover to its undeflected condition after impact.

As indicated in FIG. 5, at least some of the energy absorbing units 12 are oriented such that intermediate walls 32 are inclined (positively or negatively) to a major incident component 36 of the impacting force. It should be appreciated, however, that the term "inclined" may alternatively include an angle of inclination (FIG. 5) which is zero or 180°. Some of the energy absorbing units 12 cooperate with the means for coordinating 24 to afford mutual support in decelerating an object that imparts the impacting force.

While the coordinating means may be located at an intermediate section of a wall 32, it will be appreciated that it may also lie proximate its top or bottom edges 28,30.

It will be appreciated that the wall 32 can be characterized by a thickness (t) which may or may not be uniform between a top edge 28 and a lower edge 30 of the wall 32. In some configurations, where particular energy absorbing characteristics are desired or mandated, the wall 32 of a given energy absorbing unit 12 may have an average thickness ($t_1$) that differs from an average thickness ($t_2$) of a wall associated with another energy absorbing unit. Similarly for dome thickness.

In some embodiments (FIG. 4, for example), the means for coordinating 24 may include one or more ribs or troughs or channels. Optionally, the ribs may be provided so that stiffness results in one direction, versus flexibility in another direction. This affords additional latitude to the designer who may wish to confer stiffness in one direction for impact resistance, yet flexibility in another direction to enable a given energy absorbing module to bend or conform to the spatial constraints imposed by the environment in which the energy absorber is installed. One example is depicted in FIG. 6. In that figure, stiffness is provided about an axis that lies in the plane of the paper, while flexibility is provided about an axis that is perpendicular to the paper.

The lower perimeter 30 of a given energy absorbing unit 12 may, for example, describe a circle, an oval, an oblate oblong, a polygon (including a quadrilateral with or without rounded corners), or an ellipse. Similarly for the upper perimeter 28 and an intermediate section of wall 32. Combinations of such shapes among adjacent energy absorbing units are deemed within the scope of the invention.

Where thermoforming is the manufacturing method of choice, slits are preferred because there is no requirement to remove slugs of unwanted material. It will be appreciated that slots tend to weaken the energy absorbing structure, other things being equal, while reducing the weight of the energy absorbing unit.

It will be apparent that in many applications, the multi-sectional energy absorber 10 may perform satisfactorily in an inverted position.

Thus far in this disclosure, there has been described a bi-section energy absorbing unit or crush box. It will be appreciated that the multi-sectional energy absorbing unit may alternatively include one section which is complimented by one or more sections, so that the energy absorbing unit may include two, three, four, or more sections. This may be desirable in those applications where a given energy absorbing unit may require its energy absorbing characteristics to be finely tuned. In such embodiments of the multi-section energy absorbing unit, flange sections 20, 22 may or may not be provided. Similarly, for hinge regions 38. In some applications, the multi-sectional energy absorbing unit may be located on a supporting member such as an impact beam 11, or a highway guard rail, a barrier wall, or the like. For example, the sections could be supported by one or more grooves provided in the supporting member.

FIGS. 16-17 depict an energy absorbing unit 12 wherein an intermediate wall includes stepped portions 49 that include interconnecting sections 48. Preferably, the step portions 49 have a lesser thickness closer to the dome 42 than at the means for coordinating 24. This tends to provide collapse characteristics wherein the stepped portion proximate the dome 42 collapses in response to a force applied before a step portion 49 that is closer to the means for coordinating 24.

If desired, the interconnecting sections 48 may likewise be tapered, inclined to an axis of symmetry, and be in some embodiments thinner closer to the dome 42. This tends to provide a preferential collapse regimen wherein sections closer to the dome 42 collapse before those closer to the means for coordinating 24.

It will be appreciated that the interconnections 48 need not lie in an horizontal plane, but instead may be oriented at an inclination thereto.

In some embodiments, a designer may decide to nest or stack one or more energy absorbing modules. The scope of the claimed invention is expressly contemplated to comprehend such configurations.

Additional features and alternate embodiments of the absorber are depicted in FIGS. 18-32.

In FIG. 18, there are depicted two species of absorbing units 12 wherein the footprint is generally quadrilateral or oval. It can be seen that the central energy absorbing unit 12 is shaped as a parallelopiped. As depicted, a central absorbing unit 12 is generally shaped as a prism, except that its sixth (underside) face is missing. By deploying energy absorbing units of different geometries, the designer can adjust the distribution of energy absorbing characteristics by varying such factors as energy absorber shape and wall volume. In general, other things being equal, the embodiment depicted in FIG. 18 would tend to be more compliant (i.e. be softer) in its central, as opposed to its distal regions.

Figure 19:
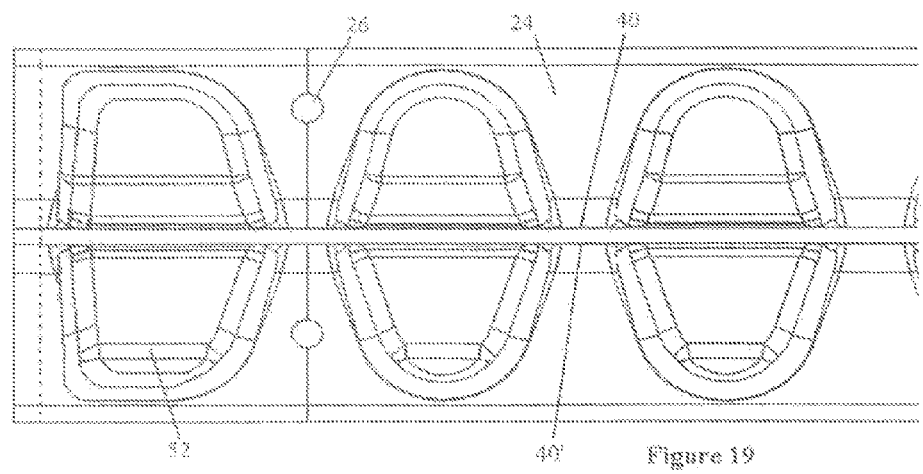
FIG. 19 is a front view of an end portion of a box-shaped energy absorber.

It was mentioned earlier that in some applications, there is a desire for relative stiffness to be provided at the distal ends of an energy absorber, proximate those locations at which the ends of a bumper beam are covered. One solution is provided by the alternate embodiment that is depicted in FIG. 19. In that Figure, there is a box-shaped energy absorber that is at a distal end of the energy absorbing module. Another embodiment in which an energy absorber is located distally is depicted in FIG. 5. In FIG. 19, the dashed line signifies the end of an underlying bumper. Thus, the absorber or countermeasure offers more structure or wall volume at or close to a corner thereof.

Figure 20:
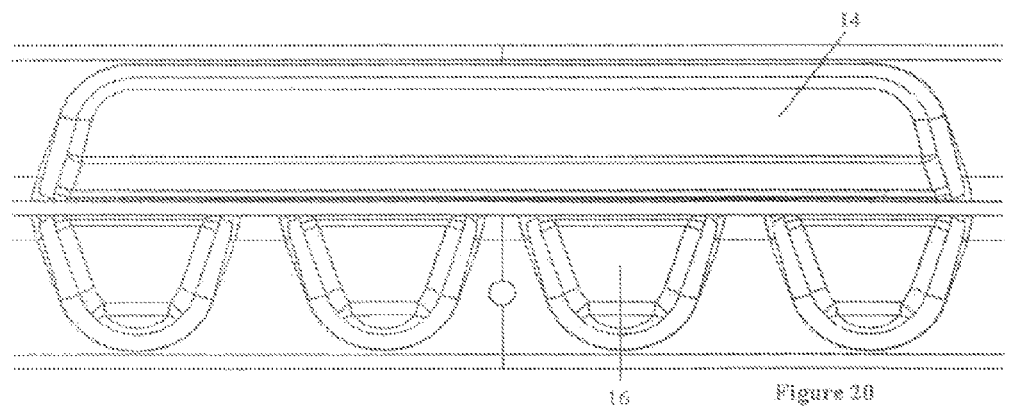
FIG. 20 is a front view of an alternate embodiment of an energy absorber that has an augmented wall volume on a lower face thereof.

The embodiment depicted in FIG. 20 is a front view that offers an augmented wall volume on a lower face than on an upper face of the energy absorber. This structure is helpful in meeting the requirements of pedestrian-friendly applications in that it offers a combination of strength (lower) and relative weakness (upper) characteristics in a given energy absorber.

Figure 21:
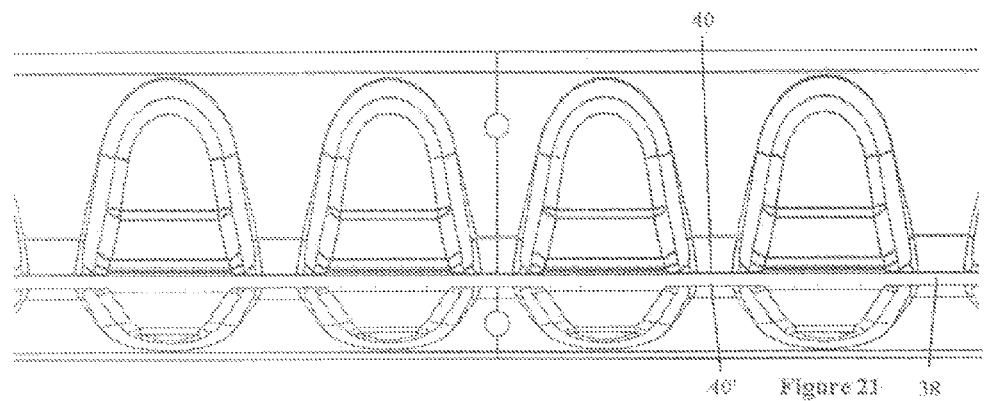
FIG. 21 is a front view of an embodiment of an energy absorber wherein a hinge region is relocated so that it is lower on a front face thereof.

FIG. 21 is the front view of an absorber where the flange section associated with a hinge region has been moved lower on the face of an energy absorber. In that embodiment, the energy absorber center of gravity has been lowered, as has its center of pressure. This embodiment offers an alternative strategy to satisfy pedestrian-impact standards.

Figure 22:
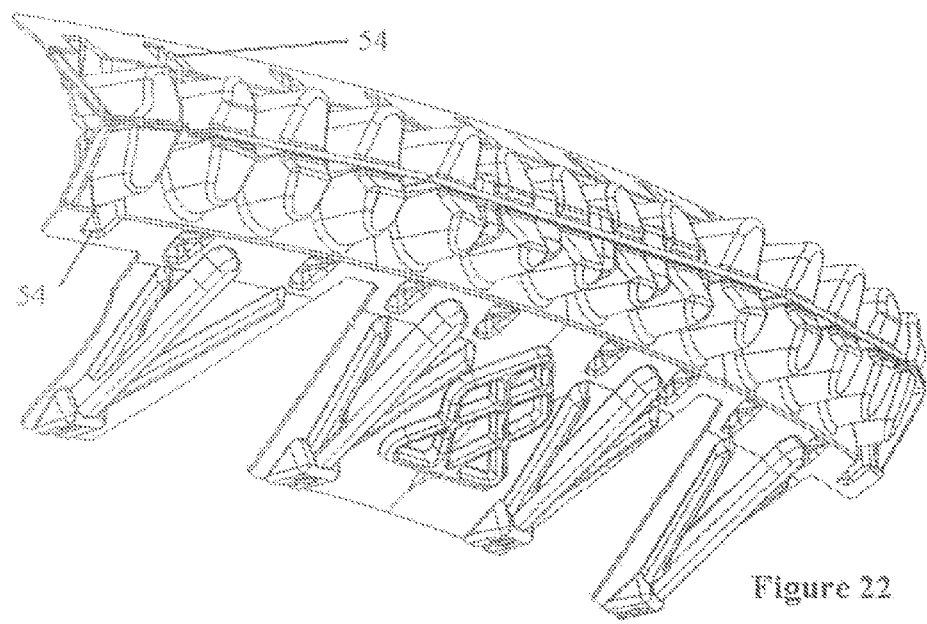
FIG. 22 is a quartering perspective view of an energy absorber that includes a means for supporting the fascia.

FIG. 22 is a an isometric view of an energy absorber that includes a structure that lends rigidity to an overlying fascia (not shown). In that embodiment, means 54 are provided for locating the energy absorber in relation to a bumper beam (not shown). It will be appreciated that the view of FIG. 22 is a quarterly perspective view from a rear side vantage point looking forwardly.

Figure 23:
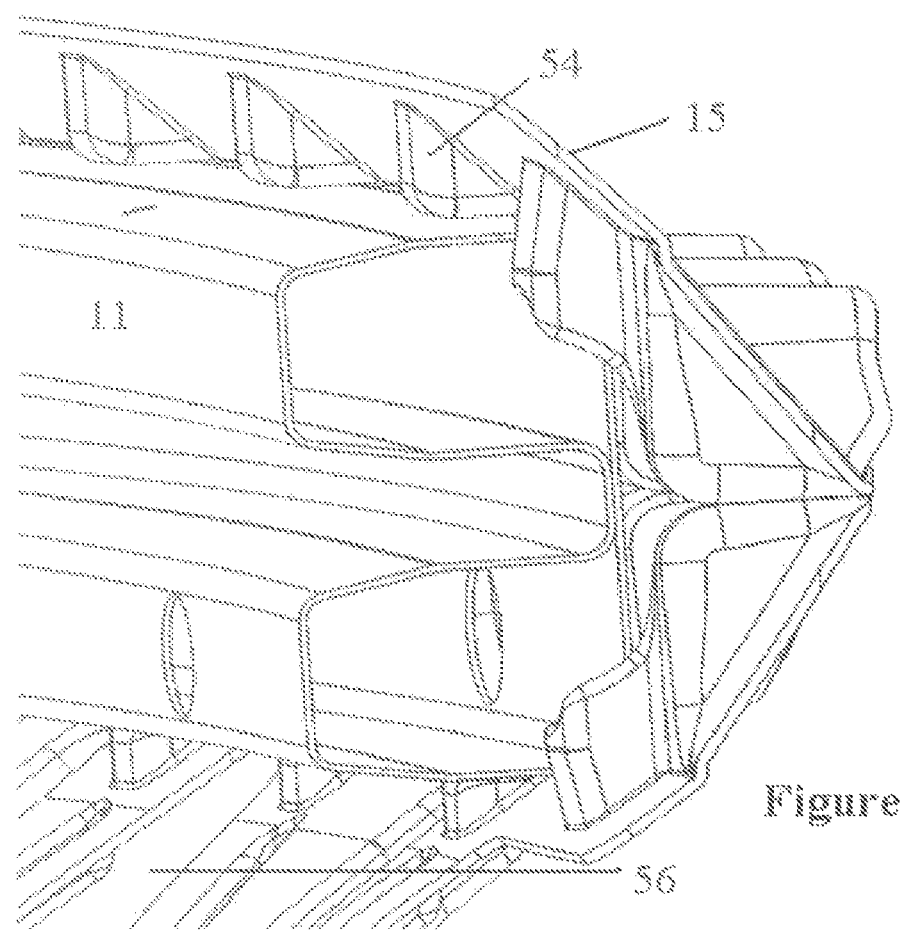
FIG. 23 is a quartering perspective view of an end of a bumper beam that is at least partially protected by an anisotropic multi-sectional energy absorber according to the present invention.

FIG. 23 is an isometric view of an end of a bumper beam to which a multi-sectional energy absorber according to the invention is secured. In that embodiment, a securement means 60, such as a push-pin, a weld, a heat stake, or equivalent methods are used to attach the fascia to the energy absorber which in turn is juxtaposed with the bumper beam.

Figure 24:
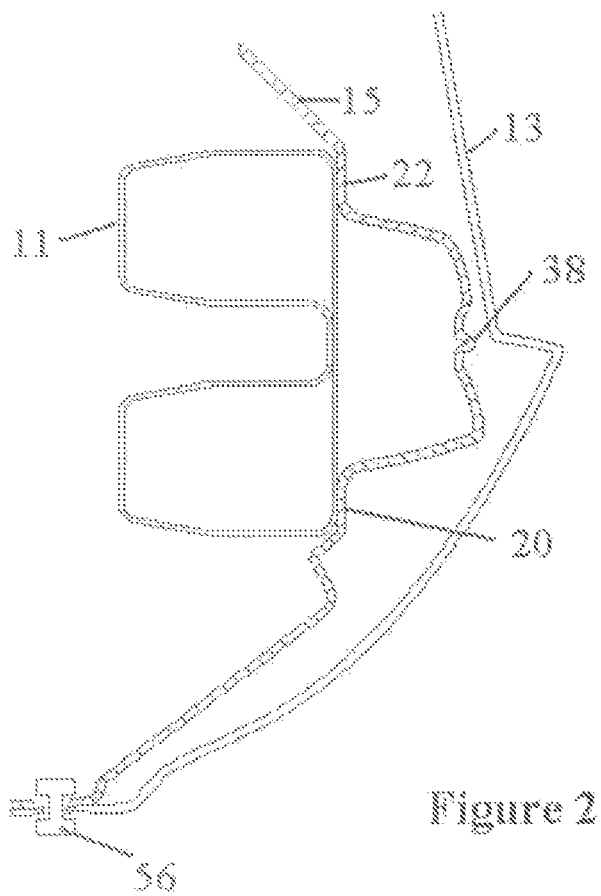
FIG. 24 is a sectional view of a fascia-energy absorber-bumper beam system that illustrates one way to attach the energy absorber to the bumper beam and fascia.

FIG. 24 is a sectional view illustrating one way in which to attach a flange to overlying fascia. Various means 56 can be deployed to attach the energy absorber to the fascia. Such attachment means can, for example, include a push-pin, a weld, a heat stake, or other equivalent methods. It will be appreciated that various features, such as snap features of the attachment means 56 can be located adjacent to the energy absorber or the fascia and a snap acceptor member can be located on the opposite component. In that view, conventional means are used at the lower portion of FIG. 24 to attach the fascia to the energy absorber which in turn rests upon or is attached to the underlying bumper beam.

Figure 25:
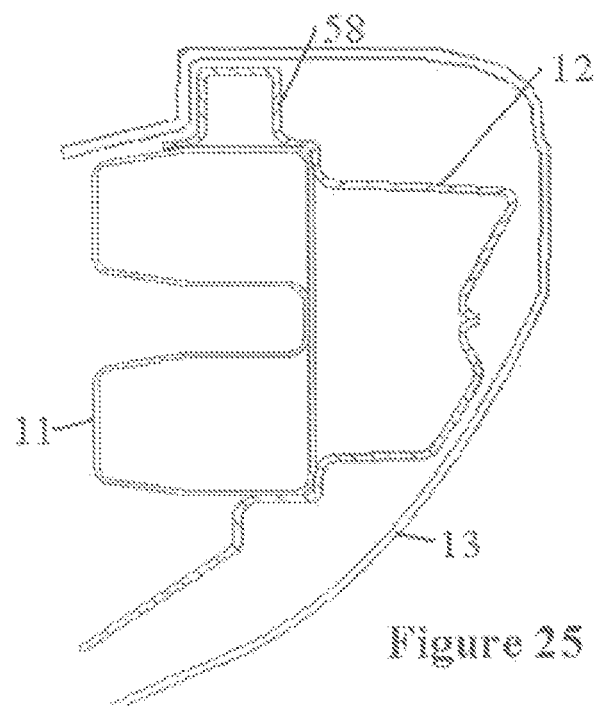
FIG. 25 depicts a sectional view of an energy absorbing system that supports knee loads that are downwardly applied from an upper region thereof.

FIG. 25 is a sectional view of a formed structure that includes a knee-support means. It has been found that such applications are helpful at the rear of, for example, a vehicle, where it might be helpful to position one's knee before or while bending forwardly to facilitate access to the trunk of the vehicle. It will be appreciated that in some applications, it might be desirable to provide such a support structure at the front of the vehicle where it might be useful to kneel while inspecting or working on an engine or trunk that is situated at the front of the vehicle. In the embodiments shown, the energy absorber may float in the sense that has few locating points.

Figure 26:
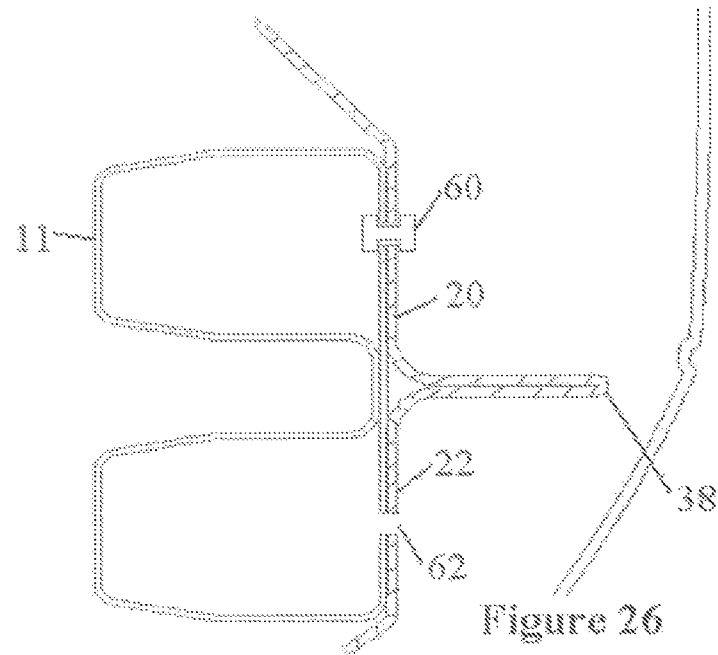
FIG. 26 is a sectional view of an embodiment of an energy absorbing system that depicts one way in which part of an energy absorber may be attached to a bumper beam.
Figure 27:
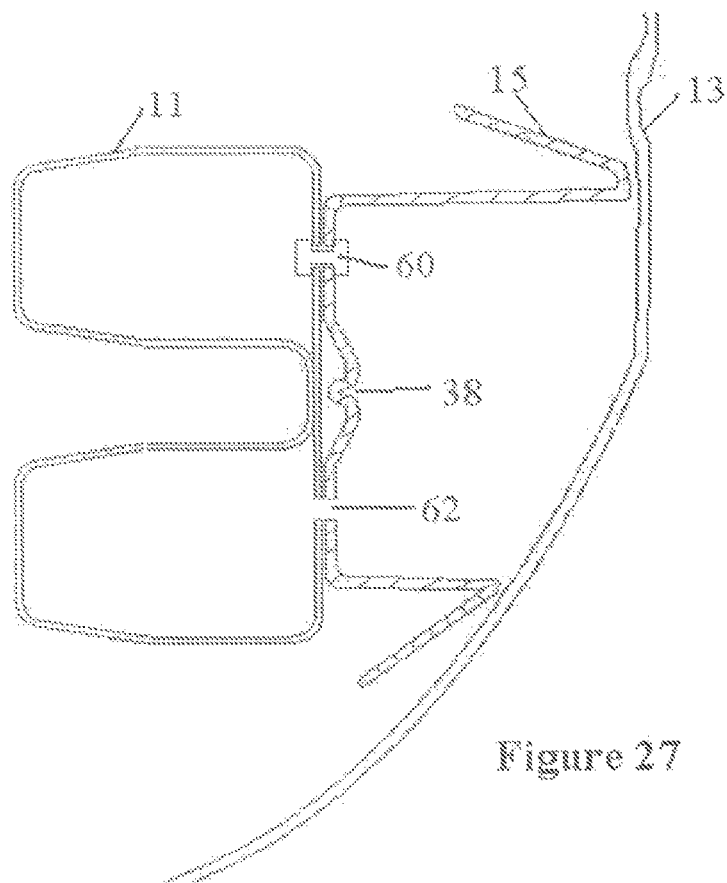
FIG. 27 is a sectional view of an embodiment of an energy absorbing system that illustrates how a dome of an energy absorber may be attached to a face of a bumper beam.

FIGS. 26-27 illustrate ways in which an energy absorber may be attached to a bumper beam. A flange 20,22 (FIG. 26) or a dome (FIG. 27) of an energy absorbing unit has an aperture 62 through which a securement means 60, such as a fastener can extend so that it may penetrate and be secured on the underside of a mating aperture in the bumper beam 11.

Figure 28:
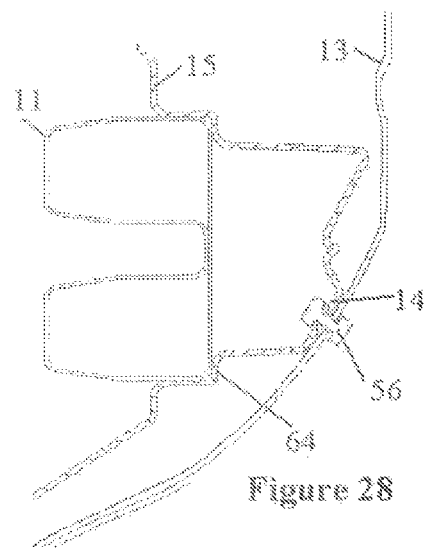
FIG. 28 is a sectional view of an embodiment of an energy absorbing system that illustrates how a dome of an energy absorber may be attached to fascia.

In FIG. 28, a dome 42 of an energy absorber 15 is attached to the fascia 13. In that embodiment, a base 64 of the energy absorber merely is positioned astride the bumper beam.

Figure 29:
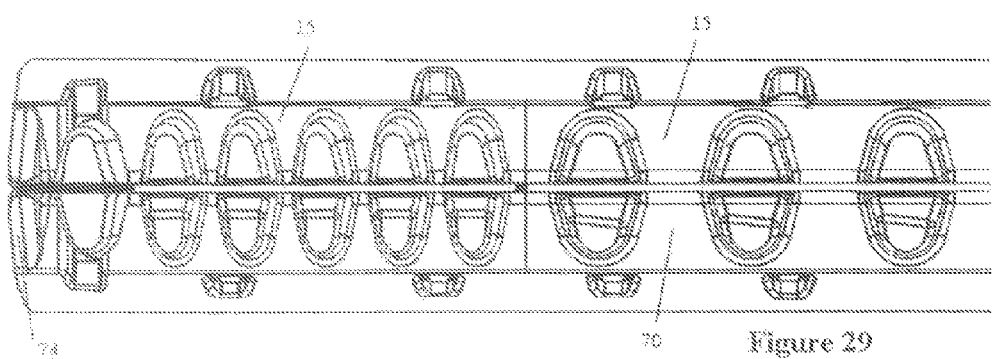
FIG. 29 is a front view of an embodiment of an energy absorber illustrating an absorber that is anisotropic in that it has multiple densities of energy absorbing structures wherein the number of energy absorbing units per unit length at a central portion is less than the number of energy absorbers per unit length toward the end of the energy absorber.

FIG. 29 is a front view of an embodiment of an energy absorber which illustrates one way in which the energy absorbing characteristics can be designed to vary along the length of the energy absorbing modules 15. In the embodiment illustrated, the central regions 70 tend to be softer than the more stiff distal regions.

Figure 30:
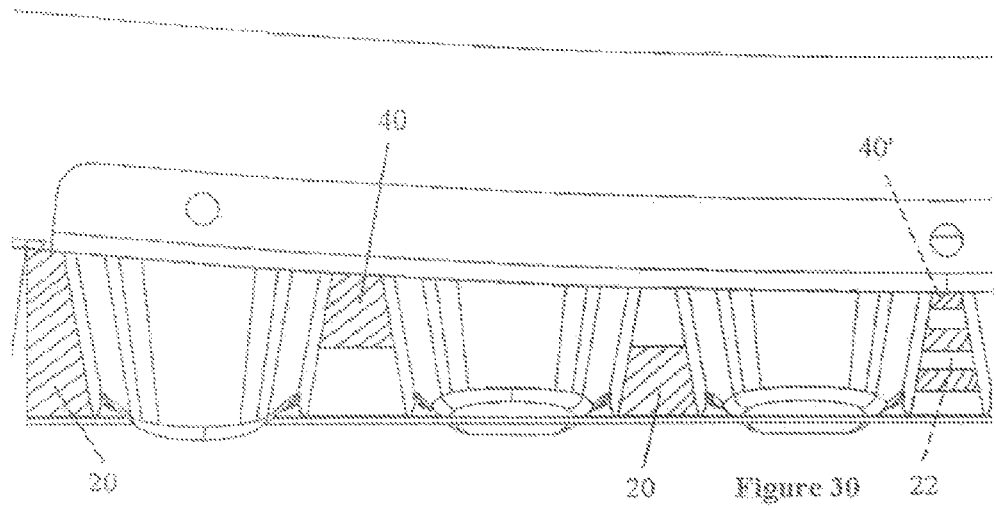
FIG. 30 is a top view that illustrates an embodiment of an energy absorber wherein different mating surfaces are joined together between adjacent energy absorbing units.

FIG. 30 illustrates a top view of different mating surfaces that are joined between energy absorbing units. The embodiment depicted includes areas where leaves 40,40' of hinges 38 or flanges 20,22 are adjoined by conventional means. In general, it can be stated that one purpose of the invention is to minimize system deflection and damage by providing the maximum amount of crush resistance without loading an underlying support surface such as a bumper beam to the point of failure or buckling.

Figure 31:
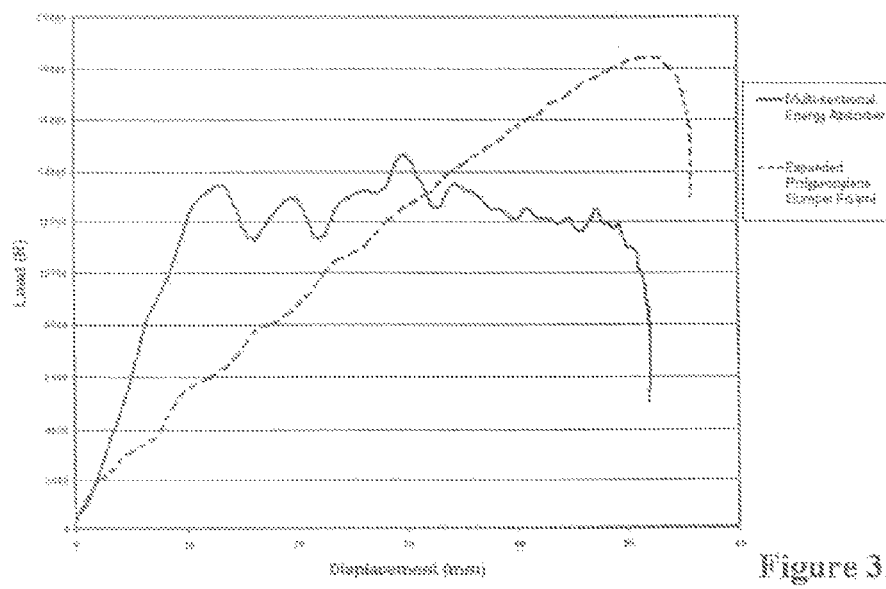
FIG. 31 is a graph of displacement against dynamic force comparing the performance of a multi-sectional energy absorber with an expanded polypropylene bumper foam.

FIG. 31 includes two dynamic force versus deflection curves that respectively illustrate the energy absorbing characteristics of a multi-sectional energy absorber according to the present invention and the energy absorbing characteristics of an expanded polypropylene bumper foam. In general, the energy absorbing characteristics of the disclosed invention (solid line) are more favorable than those of a prior art approach (dashed line). For example, up to a displacement of about 30 millimeters, more force is absorbed by the inventive than the prior art energy absorber. In general, the inventive energy absorber tends to exhibit a more preferable "square wave" form than the expanded polypropylene bumper foam.

Figure 32:
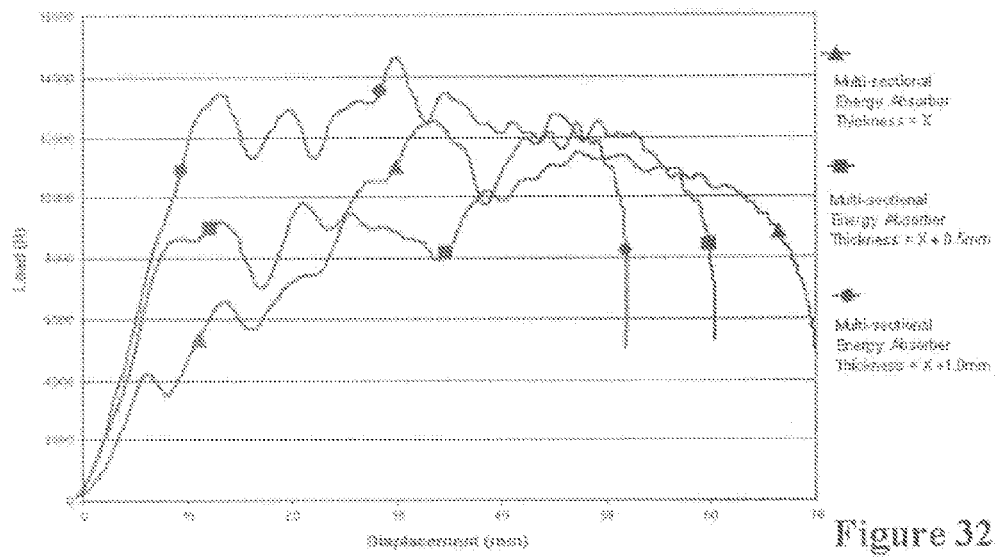
FIG. 32 is a graph of displacement against dynamic force for different beginning sheet thicknesses.

FIG. 32 depicts three graphs of displacement against load for different thicknesses of the inventive energy absorber. In general, as the thickness of the sheet from which the energy absorber is made rises, so also does the load that can be supported for a given displacement. A corollary observation is that in general, for a given load, the amount of displacement rises as the thickness of the sheet from which the energy absorbing unit is made diminishes.

Figure 33:
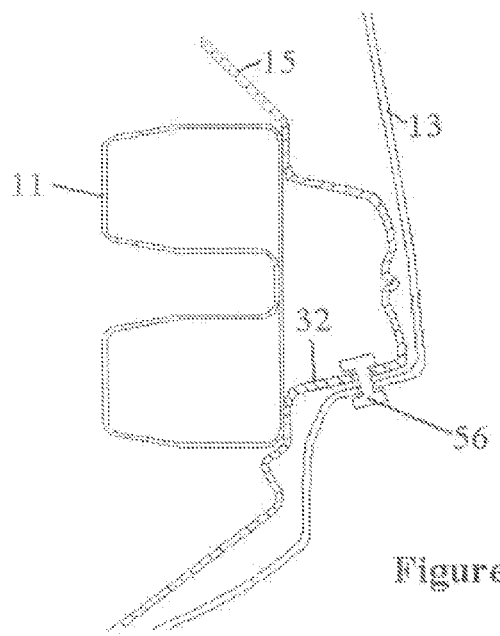
FIG. 33 depicts an embodiment of an energy absorbing system wherein an attachment point is placed in an intermediate wall of an energy absorbing unit.

FIG. 33 illustrates an embodiment of an energy absorbing system wherein an attachment point is placed in an intermediate wall of an energy absorbing unit.

As an overview of the structural and functional attributes of the energy absorbers disclosed herein, it may be stated that additional options are hereby provided for covering a support surface at its corners. These options are provided by variations of energy absorbing structures that have absorbing characteristics that are preferable to those available by deploying alternative energy absorbing structures or materials such as inserted foam, stacked thermoformed parts, and the like. Desirably, the disclosed energy absorber has in some embodiments, a box-shaped contour that enables the corners of a beam face to be covered. This allows a weld flange to overhang the end of the beam such that energy absorbing geometry will lie closer in proximity to the end of the beam.

As illustrated in FIGS. 30-31, under some circumstances, deflection is minimized for a given impacting force. This typically tends to reduce the amount of damage to tail lamps, for example, on a vehicle.

As illustrated, the multi-sectional energy absorber can be attached in several ways, including: coordinating means attached to fascia (FIG. 24); coordinating means attached to bumper beam (FIG. 26); dome attached to bumper beam (FIG. 27); and dome attached to fascia (FIG. 28).

2. The Design Method

To address the problem of thinning, the designer now has the ability to mold a clamshell-like multi-sectional, possibly anisotropic modular energy absorber in a tool. The intermediate part as it leaves the tool resembles that depicted in FIG. 9. Problems of excessive thinning and non-uniformity of thickness distribution are minimized.

The designer now has the latitude to call for energy absorbing units having intermediate walls 32 which are significantly higher or taller than by following conventional practices.

One method for configuring a multi-sectional modular energy absorber comprises the steps of:

selecting one or more energy absorbing units having multiple sections, according to given spatial constraints and desired energy absorbing criteria;

providing a means for coordinating energy absorbing units with a pre-defined contoured topography;

locating one or more energy absorbing units in association with the means for coordinating energy absorbing units so that the one or more energy absorbing units are positioned in relation to each other before, during and after relative motion between an incident object and the energy absorber;

providing a wall within some of the one or more energy absorbing units so that the wall provides an upper perimeter, a lower perimeter, and an intermediate section extending therebetween;

defining a number (m) of breaches within the wall, (m) being an integer selected from the group consisting of (0, 1, 2, 3, . . . , 1000);

providing a number (n) of apertures defined within the means for coordinating energy absorbing units, (n) being an integer selected from the group consisting of (0, 1, 2, 3, . . . 1000);

defining how to attach the energy absorber to a substrate or support surface (such as a bumper beam);

deciding how to attach a fascia to the energy absorber or bumper beam;

quantifying the resulting modular energy absorbing characteristics of the absorbing structure;

comparing the characteristics with those desired; and reiterating as necessary.

3. The Manufacturing Method

The manufacturing method contemplated by the present invention can usefully be deployed where the height of the energy absorbing unit 12 exceeds about 50 millimeters. The invention, is not however, limited to absorbers that are so dimensioned. By using a manufacturing method that calls, for example, for the preparation of a clamshell-like multi-sectional energy absorber, energy absorbing units can be manufactured which are tall, or short, or intermediately sized, depending upon the designer's preference.

An absorber's crush resistance can be "tuned" or "dialed up or down" to provide the greatest measure of energy management or the highest level of vehicle or occupant protection for a given set of impact conditions. Foam energy absorbers can be tuned by a change in density, but have proven to be less efficient than those composed of metal, thermoplastic, or composite materials (see, e.g. FIG. 15). Metal and composite absorbers are proven to be more expensive than their plastic counterparts, such as injection molded and thermoformed energy absorbers.

Slits (no material removed), or slots (areas devoid of material) may be provided which run mostly parallel to an axis of symmetry of a given energy absorbing unit. Such breaches may or may not be present, but when present, the slots may or may not be of varying width. As discussed earlier, ribs that protrude from the interior or exterior of a wall of an energy absorbing unit may or may not be present.

The presence of breaches, such as slits, or slots reduces the crush resistance of a given energy absorbing unit. The number of slits 34 can also be changed to optimize impact performance to a lesser degree. Preferably, but not necessarily, the slits should run along at least a majority of the entire length of the wall 32.

In summary, the crush resistance of each recess can be varied in order to optimize the impact performance with a minimal impact on tooling cost. It also lends itself to high manufacturing rates and low costs versus current competitive products, while still providing excellent impact performance.

4. Experimental Observations

Experiments have been performed to observe the resistance characteristics of a given absorber design and efficiently tune or optimize its geometry to match known benchmarks (up to 80 psi) of given countermeasures.

Figure 14:
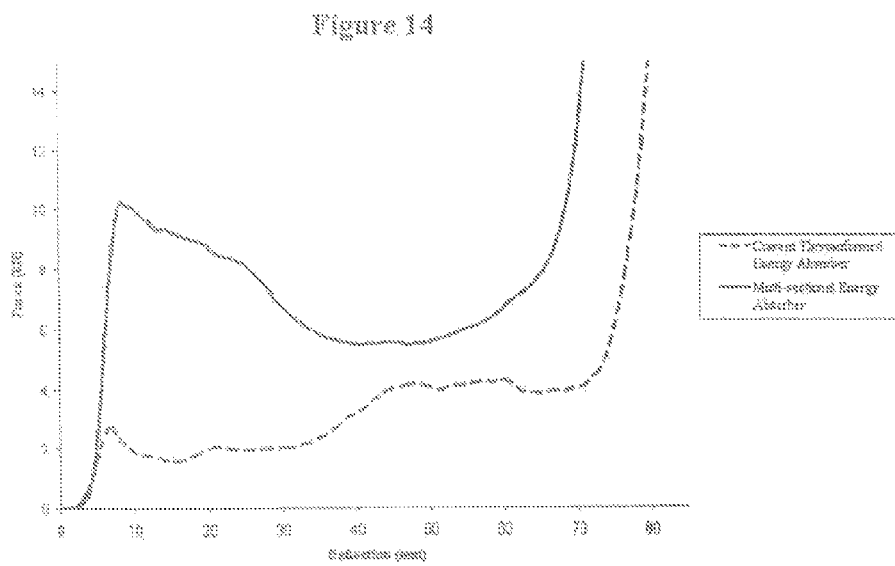
FIG. 14 is a graph of force versus deflection for a conventional thermoformed energy absorber (lower line) and one constructed according to the present invention (upper line)

FIGS. 14-15 are force versus deflection curves. FIG. 14 includes two curves: the lower curve reflects the performance of current thermoformed energy absorbers. The upper curve depicts the energy absorbing performance of a structure made according to the present invention.

Noteworthy is that the inventive energy absorber (upper curve) has a yield point that is about 3.9 times higher than standard thermoformed energy absorber. As used herein the term "yield point" connotes a force that the part will take before it plastically deforms—i.e. the first point where the curve goes from vertical to horizontal. Noteworthy also is that the inventive energy absorber has an energy absorption that is about 1.8 times greater than standard thermoformed cones. Energy absorption is represented by the area under the curve.

FIG. 15 is a force versus deflection set of observations that compare the inventive energy absorbers (lower curve) to EPP bumper foam. The invention has an 18% greater deflection than the foam when the force is 35 kN.

An equation commonly used to calculate energy absorbing efficiency is:

$$EA\ \text{Efficiency} = \frac{(\text{Area under } F - D \text{ Curve})}{(\text{Rectangular area with same maximum } F \text{ and } D)}$$

Applying this equation, the invention (FIG. 15) also has an energy absorbing efficiency of 65% while that of the foam is 51%.

Experimental observations reveal that the resistance characteristics of the energy absorbing units are most sensitive to the number of slits or slots and wall thickness. The mean pressure exerted by an energy absorbing module in response to an impacting force can also be tuned by adjusting the spacing between energy absorbing units within practical manufacturing and performance limits. One can therefore optimize the resistance pressure of the module for a given set of impact conditions by changing the design of the units and their spatial orientation within the module.

Additional examples and experimental results are shown in FIGS. 31-32, which were discussed earlier.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A multi-sectional, modular energy absorber placed adjacent to a support member comprising:
   one or more modules, each of the one or more modules having an average energy absorbing characteristic so that when positioned in relation to the underlying support elongate member, a module positioned adjacent an end of the support member has energy absorbing characteristic that differs from that in proximity to a central region of the support member, at least some of the one or more of the modules having:
   an energy absorbing unit, at least some of the units having a first section and a second section that are juxtaposed to form an energy absorbing unit;
   a first and second flange section extending from the first and second sections;
   means for locating the first and second sections in relation to each other, the locating means being provided in the first and second flange sections;
   means for coordinating energy absorbing units the means for coordinating having a topography including a number (n) of apertures defined therein, where n is an integer≧0, the means for coordinating positioning the energy absorbing units in relation to each other before relative motion between an incident object and the modular energy absorber, so that impact forces resulting therefrom are at least partially absorbed by at least some of the energy absorbing units,
   at least some of the first and second sections including an upper perimeter, a lower perimeter and an intermediate wall extending therebetween and a number (m) of breaches defined in the intermediate wall before impact, where m is an integer≧0, the wall at least partially collapsing during energy absorption and resisting a major incident component of the impacting force, and wherein at least some of the energy absorbing units cooperate with the means for coordinating to afford mutual support in decelerating an object that imparts the impacting force.

2. The modular energy absorber of claim 1, wherein the end modular energy absorbing characteristic is stiffer than that of the module positioned in a central region of the support member.

3. The modular energy absorber of claim 1, further including:
   a hinge region with leaves positioned between the first and second sections, the first and second sections being provided with a dome, each leaf extending from one of the domes.

4. The modular energy absorber of claim 3, wherein the hinge region lies below an imaginary center line that extends longitudinally along the elongate underlying support member.

5. The modular energy absorber of claim 3, further including a number of domes in a second section is separated by the hinge region from a first section that lie on an opposing side of the hinge region, thereby enabling the energy absorber to have an average energy absorbing characteristic on one side of the hinge region that differs from an average energy absorbing characteristic on the opposing side of the hinge region.

6. The modular energy absorber of claim 3, wherein at least a portion of a leaf extending from a dome in a section is joined with a portion of a leaf associated with a facing section of an energy absorbing unit.

7. The modular energy absorber of claim 3, wherein the dome has a configuration that is non-planar.

8. The modular energy absorber of claim 1, further including:
   means for locating the energy absorber in relation to the underlying support elongate member.

9. The modular energy absorber of claim 1, further including:
   means for attaching a fascia to the modular energy absorber.

10. The modular energy absorber of claim 1, wherein the number (n) of apertures equals zero.

11. The modular energy absorber of claim 1, wherein the means for coordinating comprises a form selected from the group consisting of a web, a tether, a hinge, a planar surface, a rib, a channel, a non-planar surface, and combinations thereof.

12. The modular energy absorber of claim 1, wherein an energy absorbing unit has an imaginary axis of symmetry and at least a segment of the dome is inclined to the axis of symmetry.

13. The modular energy absorber of claim 1, wherein the intermediate wall has a thickness, the thickness being non-uniform between the upper and lower perimeters.

14. The modular energy absorber of claim 1, wherein the intermediate wall of an energy absorbing unit has an average thickness ($t_1$) that differs from an average thickness ($t_2$) of a wall associated with another energy absorbing unit.

15. The modular energy absorber of claim 1, wherein a lower perimeter of an energy absorbing unit defines a geometric figure that is selected from the group consisting of a portion of a circle, an oval, an oblong, an oblate oblong, an ellipse, a quadrilateral, and a polygon.

16. The modular energy absorber of claim 1, wherein an upper perimeter of an energy absorbing unit defines a geometric figure that is selected from the group consisting of a circle, an oval, an oblong, an oblate oblong, an ellipse, a quadrilateral, and a polygon.

17. The modular energy absorber of claim 1, wherein the size of the first section differs from that of the second section.

18. The modular energy absorber of claim 1, further including one or more stiffening ribs that are associated with the first, second or both sections.

19. The modular energy absorber of claim 1, where the breaches include slots, the slots having edges.

20. The modular energy absorber of claim 1, wherein the number (m) of breaches equals zero.

21. The modular energy absorber of claim 19, wherein the slots have edges that are not parallel.

22. The modular energy absorber of claim 1, further including means for attaching the one or more modules to the support member, the means for attaching being selected from the group consisting of adhesives, push pins, formed snaps, dovetails, rivets, and combinations thereof.

23. The modular energy absorber of claim 1, wherein the intermediate wall extending between the upper and lower perimeter of an energy absorbing unit includes one or more stepped portions that are linked by interconnecting sections.

24. The modular energy absorber of claim 23, wherein the stepped portions have a thickness that is greater than the thickness of those in proximity to the upper perimeter.

25. The modular energy absorber of claim 23, wherein the interconnecting portions have a taper such that the thickness of the interconnecting portions rises with distance from an axis of symmetry of an energy absorbing unit.

26. The modular energy absorber of claim 1, further including:
    means for locating the first and second sections in relation to each other, the locating means being provided in the first and second flange sections.

27. A multi-sectional, modular energy absorber placed adjacent to a support member comprising:
    one or more modules, each of the one or more modules having an average energy absorbing characteristic so that when positioned in relation to the underlying support elongate member, a module positioned in proximity to an upper region of the support member has an energy absorbing characteristic that differs from that in proximity to a lower region of the support member, at least some of the one or more of the modules having:
    an energy absorbing unit, at least some of the units having a first section and a second section that are juxtaposed to form an energy absorbing unit;
    a first and second flange section extending from the first and second sections;
    means for locating the first and second sections in relation to each other, the locating means being provided in the first and second flange sections;
    means for coordinating energy absorbing units, the means for coordinating having a topography including a number (n) of apertures defined therein, where n is an integer$\geq 0$, the means for coordinating positioning the energy absorbing units in relation to each other before relative motion between an incident object and the modular energy absorber, so that impact forces resulting therefrom are at least partially absorbed by at least some of the energy absorbing units,
    at least some of the first and second sections including
        an upper perimeter, a lower perimeter and an intermediate wall extending therebetween and a number (m) of breaches defined in the intermediate wall before impact, where m is an integer$\geq 0$, the wall at least partially collapsing during energy absorption and resisting a major incident component of the impacting force, and wherein at least some of the energy absorbing units cooperate with the means for coordinating to afford mutual support in decelerating an object that imparts the impacting force.

\* \* \* \* \*

UNITED STATES PATENT AND TRADEMARK OFFICE
CERTIFICATE OF CORRECTION

| | |
|---|---|
| PATENT NO. | : 7,628,444 B2 |
| APPLICATION NO. | : 11/559504 |
| DATED | : December 8, 2009 |
| INVENTOR(S) | : Cormier et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 263 days.

Signed and Sealed this

Twenty-first Day of December, 2010

David J. Kappos
*Director of the United States Patent and Trademark Office*